United States Patent [19]

Golba, Jr. et al.

[11] Patent Number: 5,043,421

[45] Date of Patent: Aug. 27, 1991

[54] EXTRUDER ISOLATION OF POLYMERS FROM SOLUTION

[75] Inventors: Joseph C. Golba, Jr., Evansville, Ind.; Montgomery Meigs, Schenectady, N.Y.; Kenneth G. Powell, Schenectady, N.Y.; Sterling B. Brown, Schenectady, N.Y.

[73] Assignee: General Electric Company, Schenectady, N.Y.

[21] Appl. No.: 389,661

[22] Filed: Aug. 4, 1989

[51] Int. Cl.$^5$ .................. C08G 64/40; C08G 65/46
[52] U.S. Cl. ........................... 528/495; 528/491; 528/493; 528/497; 528/499
[58] Field of Search ............ 528/495, 493, 491, 497, 528/499

[56] References Cited

U.S. PATENT DOCUMENTS

| | | | |
|---|---|---|---|
| 3,082,816 | 3/1963 | Skidmore | 159/49 |
| 4,110,843 | 8/1978 | Skidmore | 366/83 |
| 4,668,768 | 5/1987 | Mendiratta et al. | 528/495 |
| 4,746,482 | 5/1988 | Ribbing et al. | 264/102 |
| 4,789,729 | 12/1988 | Nagira et al. | 528/493 |
| 4,845,193 | 7/1989 | Umemura et al. | 528/502 |

FOREIGN PATENT DOCUMENTS 1063761 1/1979 Canada.
3315803 10/1984 Fed. Rep. of Germany.

*Primary Examiner*—Harold D. Anderson
*Attorney, Agent, or Firm*—William H. Pittman; James C. Davis, Jr.

[57] ABSTRACT

Polymers, such as polyphenylene ethers, are isolated from solution in an extruder by addition of at least one non-solvent. Optional steps include removal of volatiles through vents or ports on the extruder and employment of an auxiliary non-solvent. Additional operations, such as blending with further polymers, fractionation of low molecular weight molecules and functionalization by chemical reaction, may also be performed in the extruder.

17 Claims, 5 Drawing Sheets

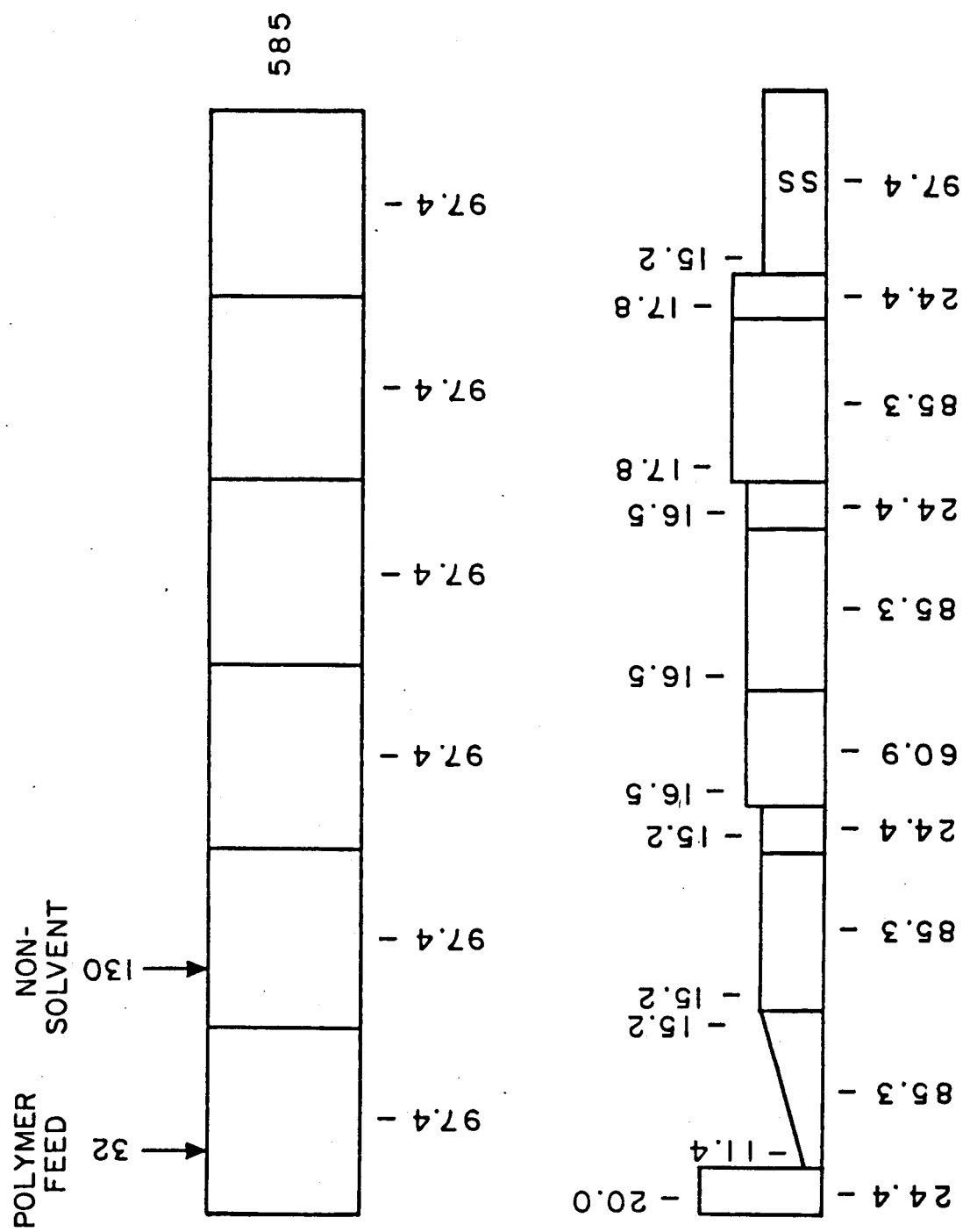

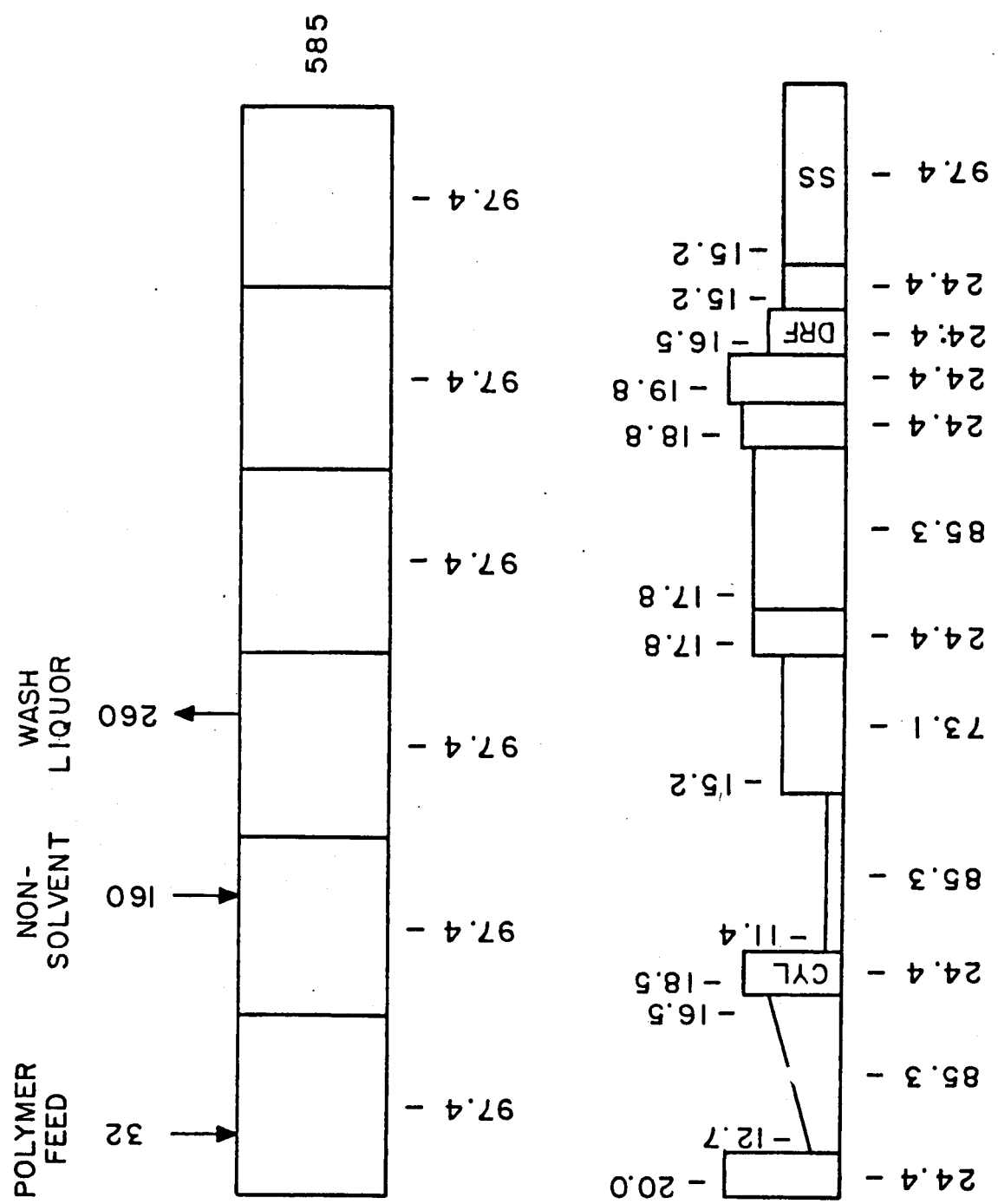

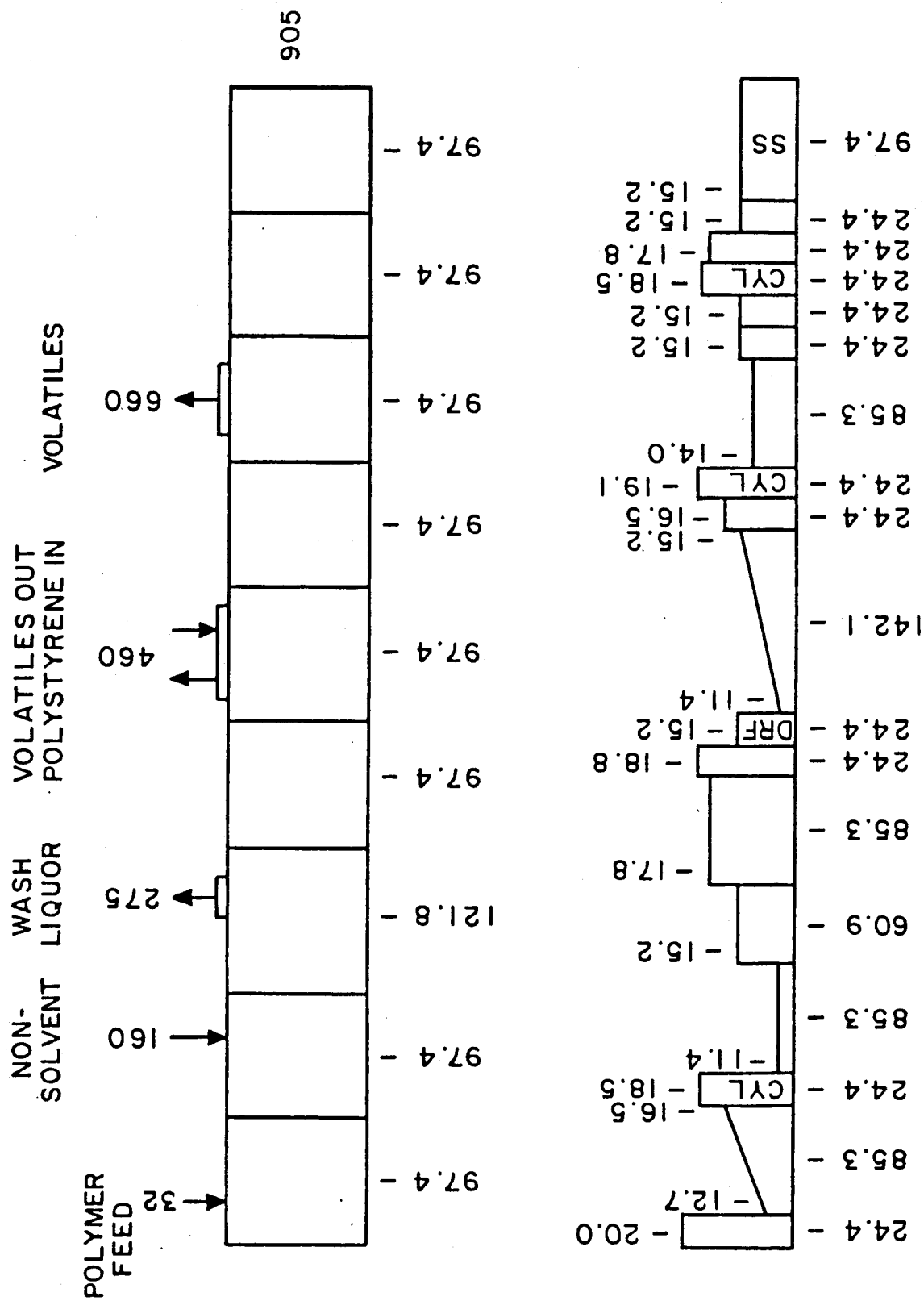

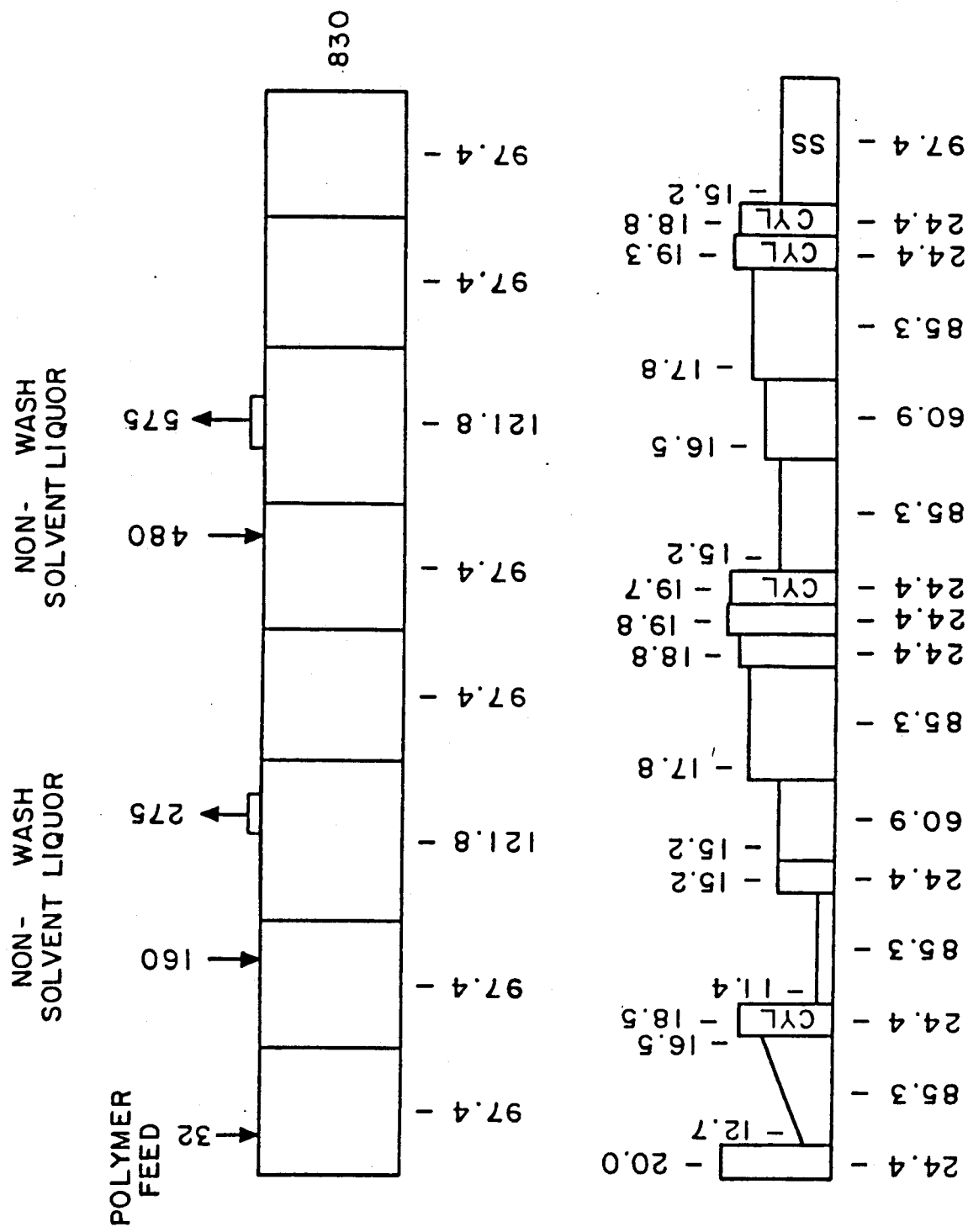

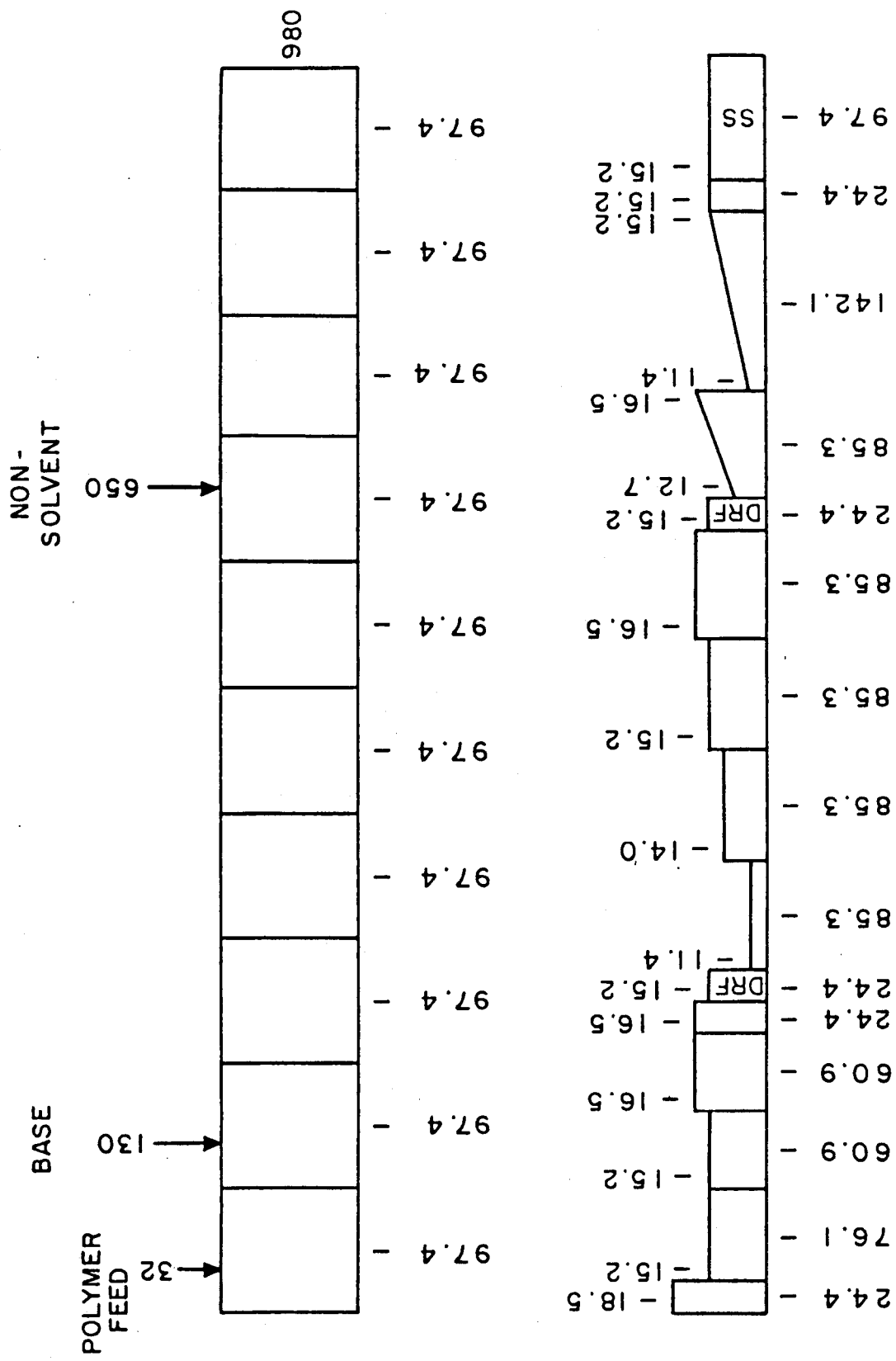

EXTRUDER ISOLATION OF POLYMERS FROM SOLUTION

This invention relates to the isolation of polymers from solution, and more particularly to an isolation method employing an extruder.

Many thermoplastic polymers are prepared in solution in organic solvents. Examples of such polymers are polycarbonates and polyphenylene ethers. Following their preparation, it is necessary to remove the solvent and recover the polymer in solid form. Such recovery typically requires elaborate equipment and energy-intensive operations.

For example, polyphenylene ethers are normally prepared in solution in an aromatic hydrocarbon, typically toluene. A typical method of recovering the polyphenylene ether from the toluene is a batch process including precipitation by the addition of a large amount of a nonsolvent such as methanol. Precipitation typically involves the use of a series of continuous stirred tanks, followed by countercurrent extraction with additional methanol.

The polyphenylene ether is recovered as a powder which must be further processed in a dryer to remove volatiles. A by-product of the whole series of operations is a mixture of toluene and methanol, both of which are ordinarily recycled. This requires separation, usually by extraction of the methanol with water followed by a very energy-intensive fractional distillation of the methanol-water mixture.

In view of the increased employment of polymers in industry, it is of high interest to provide improved methods for their handling and especially recovery which minimize the required energy input. Thus, methods are needed to recover polymers from organic solutions by efficient procedures which require a minimum of other materials such as non-solvents, and which decrease the need for such operations as fractional distillation which require a large amount of energy.

Other operations performed on polymers in solution also require undesirably large outputs of energy and/or capital expense. For example, many methods of polymer preparation afford products of undesirably broad molecular weight distribution, chiefly as a result of the presence of a large proportion of low oligomers. Removal of these "lows" by fractional solvent extraction is possible but is usually impracticable on a commercial scale, since it must ordinarily be performed in batch processes and maximizes both energy and equipment requirements.

Also, it is frequently desired to prepare a polymer containing functional groups which permit reaction with another polymer to form a copolymer; such copolymers are useful for compatibilization of blends of the two polymers. For example, simple blends of polyphenylene ethers and polyesters or polyamides are incompatible and subject to brittleness and failure as a result of phase segregation, but such blends may be compatibilized by incorporating therein a polyphenylene ether-polyester or polyphenylene etherpolyamide copolymer. The resulting compositions have numerous beneficial properties including high impact strength and solvent resistance. However, copolymer formation usually requires the presence of reactive functional groups on the polyphenylene ether, and the reaction providing such groups must often be conducted in solution which has the disadvantages previously described.

The present invention provides a method for recovering polymers from solution which requires a minimum amount of non-solvent and employs only equipment of the type readily available in polymer processing facilities. By suitable choice of non-solvent, both solvent and non-solvent can be recovered and recycled with relatively low energy input. The method may be conducted continuously and is adaptable to additional operations involving the polymer, including fractionation into portions of relatively narrow molecular weight distribution, blending with other polymers and functionalization by chemical reaction.

Accordingly, the invention is a method for removing solvent from a polymer solution which comprises separately feeding to an extruder said solution and at least one liquid non-solvent for said polymer to produce a polymer slurry, said non-solvent being at least partially soluble in said solvent, and recovering as the extrudate said polymer in combination with any remaining solvent and non-solvent.

The invention will be described in part with reference to the drawings, which are formalized sketches (employing conventions established by Welding Engineers, Inc.) of extruder configurations which may be employed in various embodiments.

The method of this invention may be employed with any polymer prepared in solution in an organic solvent. As previously mentioned, examples of such polymers are polycarbonates and polyphenylene ethers. Polycarbonates are typically prepared in solution in a chlorinated aliphatic hydrocarbon such as methylene chloride, and polyphenylene ethers in an aromatic hydrocarbon such as toluene. Those skilled in the art will readily appreciate that numerous other polymers may be similarly recovered.

The principal item of equipment required for the method of this invention is an extruder. Numerous types of suitable extruders are known in the art, including commonly available single- and twin-screw extruders. Suitable twinscrew extruders (which are preferred) include those disclosed, for example, in U.S. Pat. Nos. 3,082,816 and 4,110,843, the disclosures of which are incorporated by reference herein. It will be evident that extruders are particularly adaptable to continuous operation in the context of the invention, although batch operation is also contemplated.

Such extruders comprise one or more screws; a die at the downstream end, through which extrusion takes place; and a polymer feed port at or near the upstream end. They also usually contain one or more material introduction ports and/or vents distributed over the length thereof. The vents are normally constructed so that a vacuum may be drawn through them, facilitating removal of volatiles. Also present in most instances are heating means which facilitate bringing the material being extruded to a temperature adapted for removal of volatiles; a second factor in the attainment of such temperature is the frictional energy imparted to said material by the shearing and mixing action of the extruder screws.

Said screws most often contain numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including the aforementioned Welding Engineers, Inc.

Because of its particular applicability thereto, the invention will be described hereinafter principally with respect to solutions of poly(2,6-dimethyl-1,4-phenylene ether) in toluene. Those skilled in the art will understand that it is capable of much broader application.

The polyphenylene ether solution is fed to the extruder through the polymer feed port therein. Said solution generally has a polymer concentration of at least about 15% and preferably at least about 25% by weight; if its concentration is lower, a portion of the toluene may be flash evaporated and may exit through a rear vent in the extruder. At least one liquid non-solvent for the polymer is also introduced, usually through at least one material introduction port downstream from the feed hopper. Any suitable liquid or combination of liquids which is at least partially soluble in the solvent, but which does not dissolve or react with the polymer, may be employed as the principal or only non-solvent; in the case of polyphenylene ethers, such liquids as methanol, 2-propanol, acetone and hexane are useful for this purpose, with methanol frequently being preferred.

It is within the scope of the invention to maintain the extruder over its entire length at a relatively low temperature, whereupon little evaporation of solvent or nonsolvent occurs. In that case, the extrudate will be a polymer slurry in the combination of solvent and non-solvent, or a particulate solid thoroughly wetted with solvent and non-solvent.

It is frequently preferred, however, to maintain at least a portion of the extruder at a temperature effective to vaporize at least a portion of the combination of solvent and non-solvent. The temperature is normally varied continuously over the length of the extruder; low temperatures are often preferred nearest the polymer feed port, with the temperature becoming progressively higher as the die is approached so as to promote volatilization of the solvent and non-solvent. In the case of polyphenylene ether solutions in toluene, temperatures varying from about 50°–60° C. at the feed hopper to about 325° C. at the die are often preferred. By employing such temperatures, it is possible to remove a major proportion of the volatile liquids through the vents in the extruder, at least partially as vapor but also to some extent as liquid.

For example, a non-solvent such as methanol, 2-propanol, acetone or a similar liquid in terms of polarity and volatility may be introduced downstream from the polymer feed port, so as to flow either co-current with or countercurrent to the polymer solution. The weight ratio of nonsolvent to polymer solution fed to the extruder is typically in the range of about 0.75–1.0:1. Under these conditions, a substantial proportion of polymer solvent is volatilized and a large amount of the non-solvent also exits through the vents, as both vapor and liquid. (Some liquid exit through reagent introduction ports may also occur, but minimization thereof is preferred.)

Another preferred feature of the invention is the presence of at least one liquid seal in the extruder, downstream from at least one of the vents therein. A combination of conditions is normally employed to provide this liquid seal. One such condition is the design of the extruder screws, which should include elements imposing a requirement of positive pressure to insure resin flow such as the aforementioned cylindrical elements which decrease the effective channel volume.

Another condition which has a major effect on the creation and maintenance of a liquid seal in the extruder is the nature of the material being extruded. It is possible to vary the proportions of solvent and non-solvent to provide, in combination with the polymer, a composition of optimum plasticity to create a seal. In certain instances, this is best achieved by introducing, in combination with the principal non-solvent, an auxiliary non-solvent which has substantial solubility therein but is substantially immiscible with the solvent, thereby causing a partition of solvent between principal non-solvent and resin so as to lower the effective glass transition temperature of the polymer phase. A suitable auxiliary non-solvent for polyphenylene ether-toluene systems is water, which increases the polarity of the non-solvent phase so as to exclude a major proportion of toluene therefrom. The toluene thus remains in the polymer phase, decreasing the glass transition temperature thereof and creating an effective liquid seal.

The extrudate obtained by the method of this invention may take several forms. If little or no evaporation of solvent and non-solvent occurs in the extruder, the extrudate will be a slurry from which polymer may be separated by filtration. If a substantial amount of non-solvent and proportionally less solvent is removed in the extruder, it may range from a particulate solid to a viscous semi-solid comprising polymer plasticized with remaining solvent. The conditions in the extruder, including temperature, feed rate, screw design and degree of removal of solvent and non-solvent, may be adjusted by those skilled in the art to achieve recovery of the polymer in the desired form.

The invention may be employed in several embodiments. For example, simple precipitation can be achieved by introducing non-solvent through one or more material introduction ports in the extruder. If no steps are taken to modify the flow conditions in the extruder, nonsolvent flow will then be concurrent with flow of the polymer solution. It is usually preferred to introduce non-solvent into a relatively deep channel section, most often downstream from a region of low channel volume so as to suppress backup of non-solvent toward the polymer feed port. The mixture may then be conveyed by means of screw elements of progressively greater diameter, decreasing the channel volume and causing the polymer slurry in a mixture of solvent and non-solvent to exit the extruder through the die. It is also possible to introduce the non-solvent at a point farther downstream and force it to flow countercurrent to the polymer solution by applying hydrostatic pressure thereto; in that case, a liquid seal is preferably provided downstream of the polymer feed port as described hereinabove, to avoid backup of non-solvent into said port. In either case some loss of volatiles by evaporation can often be expected, at least partially as a result of frictional heat generated during extrusion.

A second embodiment includes removal of a portion of the volatiles, at least in part in the vapor state but often principally by liquid expulsion, from the extruder through a vent or a further port downstream of the nonsolvent introduction port. Simultaneous loss of polymer may be suppressed, for example, by means of a mechanical filter which forces entrained solids back into the extruder. It is frequently preferred to employ more than one non-solvent introduction and removal stage; among the advantages thereof are a lower proportion of colored impurities in the polymer. In that event, liquid seals should separate said stages.

A third embodiment permits the removal of low molecular weight fractions from the polymer, by employing as a non-solvent a liquid in which said lower fractions remain in solution but from which higher molecular weight molecules will precipitate. When the polymer being treated is a polyphenylene ether, acetone is a suitable liquid for this purpose although methanol may also be used. The extrudate will then have higher molecular weight and lower molecular weight distribution than a corresponding non-fractionated polymer, and, as a result, may be characterized by improved impact strength and high resistance to environmental stress cracking.

In a fourth embodiment, at least one other polymer is added downstream of at least one non-solvent contact region. For example, it is known that polystyrenes are miscible in all proportions with polyphenylene ethers. It is possible to prepare a blend of polyphenylene ether and various polystyrenes, including homopolymer and rubbermodified or "high impact" polystyrene, by addition of the polystyrene through a vent downstream of the ports through which non-solvent is added and wash liquor is expelled.

A fifth embodiment includes reaction of the polymer with at least one compound to introduce functional groups therein. Thus, polyphenylene ethers can be made to undergo reaction, under the extrusion conditions employed according to the invention, with such compounds as maleic anhydride, trimellitic anhydride acid chloride (TAAC) and especially reactive triazines including epoxyalkyl chlorocyanurates, chloroaryloxytriazines and triaryl cyanurates.

The invention may be employed for melt functionalization, illustrated by the reaction of polyphenylene ethers with unsaturated compounds such as maleic anhydride or glycidyl methacrylate. Ordinarily, such melt functionalization reactions will require downstream feeding of the functionalizing reagent at a point where a major proportion of the solvent has been removed.

However, the invention is particularly useful with functionalization reactions conducted in solution, such as those between polyphenylene ethers and the aforementioned TAAC and reactive triazines. Such reactions frequently require the presence of other materials such as aqueous base and phase transfer catalysts.

Ordinarily, the polymer solution and some of the other reagents are introduced through the polymer feed port, with further reagents being introduced downstream. For example, a blend of polyphenylene ether with a chlorotriazine or a triaryl cyanurate may be fed to the polymer feed port and base added downstream.

It is often advantageous to employ an extruder with a longer barrel than usual when a reaction is to take place, to insure that it goes to completion. However, chlorotriazines often react very rapidly and their use may not require the extruder to be longer than usual. If the extruder barrel is long enough and suitably equipped for substantial devolatilization, it may be preferable to introduce additional polymers (e.g., polyamide) downstream, optionally in combination with impact modifiers and the like, for copolymer formation with functionalized polyphenylene ether. Alternatively, the functionalized polyphenylene ether may be recovered as the extrudate and blended with said additional polymers in a second extrusion operation.

The invention is illustrated by the following examples. The polymer employed in each example, unless otherwise indicated, was a 28% (by weight) solution in toluene of a poly(2,6-dimethyl-1,4-phenylene ether) having an intrinsic viscosity in chloroform at 25.C of about 0.46 dl./g.

In each example, a non-intermeshing, counterrotating twin screw extruder having a barrel diameter of 20.3 mm. was employed. In the drawings, the numbers represent measurements in millimeters for various extruder sections and for the diameters of the screw elements. The conventions established by Welding Engineers, Inc., for these elements designate that an unmarked screw element is of the conventional forward-flighted type. The symbol "CYL" represents a cylindrical element, the symbol "DRF" a double reverseflighted element, and the designation "SS" the single-screw portion of the extruder.

EXAMPLE 1

The extruder configuration of FIG. 1 was employed, with the extruder being maintained at a temperature of about 54° C. The polymer solution was introduced at 9 kg./hr., and methanol was employed as a non-solvent and added at 9 kg./hr. at the indicated point. A screw rotation speed of 400 rpm. was employed. The extrudate was a slurry of polyphenylene ether in toluene and methanol, which was immediately vacuum filtered to isolate the polyphenylene ether as a powder.

EXAMPLE 2

The procedure of Example 1 was repeated, except that the screws were rotated at 200 rpm. and the polymer solution and methanol were each introduced at 13.6 kg./hr. The extrudate was filtered to yield a friable polyphenylene ether powder, wetted with toluene and methanol.

EXAMPLE 3

Various runs similar to those of Examples 1 and 2 were conducted, using methanol and acetone as non-solvents and varying the weight ratio of non-solvent to polymer solution. The number average and weight average molecular weights of the products (relative to polystyrene) were determined by gel permeation chromatography, with the results summarized in the following table.

| Non-solvent | Wt. ratio, non-solvent/soln. | Mw | Mn | Mw/Mn |
|---|---|---|---|---|
| Methanol | 2:1 | 49,000 | 17,200 | 2.85 |
| " | 1:1 | 49,200 | 17,900 | 2.75 |
| " | 1:2 | 48,800 | 18,300 | 2.67 |
| " | 1:3 | 49,500 | 18,900 | 2.62 |
| " | 1:6 | 50,900 | 19,800 | 2.57 |
| Acetone | 1:1 | 55,200 | 25,100 | 2.20 |

These results show the feasibility of fractionally extracting polymers by the method of this invention to afford products having various molecular weights and molecular weight distributions.

EXAMPLE 4

The extruder configuration is shown in FIG. 2. Polymer solution and a non-solvent combination consisting of a 10% (by volume) solution of water in methanol were each introduced at 6.8 kg./hr., and the extruder screw speed was 350 rpm. The temperature of the extruder was maintained at 50° C. A mechanical filter was used to force entrained solids exiting with the wash liquor back into the extruder. The extrudate had a snowball-like consistency.

EXAMPLE 5

The extruder configuration is shown in FIG. 3; a screw speed of 300 rpm. was employed. The feed rates were 6.8 kg./hr. for the polymer solution and 4.5 kg./hr. for the non-solvent employed in Example 4. Temperatures varied from 57° C. at the feed hopper to 316° C. at the die end of the extruder. Styrene homopolymer was introduced via the first vent at a rate to provide a 1:1 (by weight) polyphenylene ether-polystyrene blend. Volatiles, including toluene, methanol and water, were expelled through both vents, with liquid seals being created just upstream of each vent.

The extrudate was extremely viscous and could not be stranded by passage through the extruder die, owing to limited heating means on the extruder. Therefore, the die was removed and product was recovered as a semi-solid material. It is expected that stranding could be achieved at higher temperatures.

A similar blend was prepared using a commercially available high impact polystyrene.

EXAMPLE 6

The extruder configuration in FIG. 4 was employed. The extruder was maintained at 57° C. and the screw speed was 400 rpm. Polymer solution was introduced at 6.8 kg./hr., and the non-solvent solution of Example 4 was introduced in two stages. Through the first port, nonsolvent was introduced at a ratio to polymer solution of 0.5:1, and through the second port the ratio was 2:1. A liquid seal between the first and second non-solvent addition and removal stages prevented leakage of non-solvent from one stage to the other. The extrudate was in the form of firm curls of polymer which, although dry to the touch, contained a substantial proportion of toluene as plasticizer.

EXAMPLE 7

The extruder configuration is shown in FIG. 5. The feed solution was a 20% (by weight) solution of polyphenylene ether in toluene, also containing 0.6% 2-chloro4,6-diphenoxy-1,3,5-triazine and 0.24% of a commercially available phase transfer catalyst in the form of a 10% solution in toluene, both based on polyphenylene ether. The extruder temperature was 46° C. and the screw speed was 500 rpm. Polymer solution was introduced at 4.5 kg./hr. and a 10% aqueous sodium hydroxide solution was added downstream at 54 grams/hr. The non-solvent, added farther downstream, was acetone and its feed rate was also 4.5 kg./hr. The extrudate was a slurry which was immediately vacuum filtered.

The precipitate was dried overnight at 110° C., and 49 parts (by weight) thereof was blended with 41 parts of a commercially available polyamide-66 and 10 parts of a commercially available styrene-hydrogenated butadiene-styrene triblock copolymer as an impact modifier. The resulting blend was ductile and had high impact and tensile strengths and tensile elongation.

Similar products were obtained using methanol and carbon dioxide-saturated methanol as non-solvents, the latter serving to neutralize excess base.

EXAMPLE 8

The procedure of Example 7 was repeated, substituting triphenyl cyanurate on an equal basis for the substituted triazine and employing carbon dioxide-saturated methanol as the non-solvent. The results were similar.

EXAMPLE 9

An extruder similar to that of FIG. 5, but without the port for addition of base, was employed. A 16% (by weight) solution in methylene chloride of a commercially available bisphenol A polycarbonate was fed via the polymer feed port at 4.5 kg./hr.; the non-solvent was acetone which was introduced at 5.2 kg./hr. An extruder temperature of 21° C. and a screw rotation speed of 400 rpm. were employed. The extrudate was a slurry of polycarbonate in methylene chloride and acetone, which was immediately vacuum filtered to isolate the polycarbonate as a soft powder.

What is claimed is:

1. A method for removing solvent from a polymer solution which comprises separately feeding to an extruder said solution and at least one liquid non-solvent for said polymer to produce a polymer slurry, said non-solvent being at least partially soluble in said solvent, extruding the mixture of said solution and said non-solvent under conditions whereby at least a portion of at least one of said solvent and said non-solvent is volatilized, and recovering as the extrudate said polymer in combination with any remaining solvent and non-solvent.

2. A method according to claim 1 wherein the extruder is a twin-screw extruder.

3. A method according to claim 2 wherein the polymer is a polycarbonate.

4. A method according to claim 3 wherein the polymer concentration in the solution is at least about 15% by weight, the solvent is methylene chloride and the nonsolvent is acetone.

5. A method according to claim 2 wherein the polymer is a polyphenylene ether.

6. A method according to claim 5 wherein the polymer concentration in the solution is at least about 25% by weight and the solvent is toluene.

7. A method according to claim 5 wherein the nonsolvent is methanol, 2-propanol or acetone.

8. A method according to claim 2 wherein at least a portion of the extruder is maintained at a temperature effective to vaporize at least a portion of the combination of solvent and non-solvent.

9. A method according to claim 2 wherein at least one liquid seal is created in the extruder.

10. A method according to claim 9 wherein there is introduced, in combination with the non-solvent, an auxiliary non-solvent which has substantial solubility in said non-solvent but is substantially immiscible with the solvent.

11. A method according. to claim 10 wherein the polymer solution is a polyphenylene ether solution in toluene.

12. A method according to claim 11 wherein the non-solvent is methanol, 2-propanol or acetone and the auxiliary non-solvent is water.

13. A method according to claim 12 wherein the polymer solution and the non-solvent flow concurrently.

14. A method according to claim 12 wherein the polymer solution and the non-solvent flow countercurrently.

15. A method according to claim 2 which includes removal of low molecular weight fractions from the polymer by employing as a non-solvent a liquid in which said lower fractions remain in solution but from which higher molecular weight molecules precipitate.

16. A method according to claim 2 wherein at least one other polymer is added downstream of at least one non-solvent contact region.

17. A method according to claim 16 wherein the polymer solution is a polyphenylene ether solution in toluene and the other polymer is a polystyrene.

* * * * *

UNITED STATES PATENT AND TRADEMARK OFFICE
CERTIFICATE OF CORRECTION

PATENT NO. : 5,043,421

DATED : August 27, 1991

INVENTOR(S) : Joseph C. Golba, Jr. et al.

It is certified that error appears in the above-identified patent and that said Letters Patent is hereby corrected as shown below:

Title page, item 75, the name of the second inventor should be --Montgomery M. Alger--; the fourth name, Sterling B. Brown, should be deleted.

Signed and Sealed this

Twenty-fifth Day of May, 1993

Attest:

MICHAEL K. KIRK

Attesting Officer

Acting Commissioner of Patents and Trademarks